(12) United States Patent
Howard

(10) Patent No.: US 7,743,790 B2
(45) Date of Patent: Jun. 29, 2010

(54) SHUTTER AND GATE VALVE ASSEMBLIES FOR VACUUM SYSTEMS

(75) Inventor: Layne Evan Howard, Los Gatos, CA (US)

(73) Assignee: Varian, Inc., Palo Alto, CA (US)

( * ) Notice: Subject to any disclaimer, the term of this patent is extended or adjusted under 35 U.S.C. 154(b) by 65 days.

(21) Appl. No.: 12/070,584

(22) Filed: Feb. 20, 2008

(65) Prior Publication Data
US 2009/0206249 A1 Aug. 20, 2009

(51) Int. Cl.
*F16K 3/18* (2006.01)
(52) U.S. Cl. .................. 137/630.12; 251/326
(58) Field of Classification Search .......... 251/326, 251/328; 137/630.12, 630
See application file for complete search history.

(56) References Cited

U.S. PATENT DOCUMENTS

| | | | | |
|---|---|---|---|---|
| 434,796 | A * | 8/1890 | Leslie | 137/637.2 |
| 2,873,761 | A * | 2/1959 | Tailleferre | 137/553 |
| 3,804,124 | A * | 4/1974 | Finke et al. | 137/630.14 |
| 4,193,574 | A * | 3/1980 | Barnes et al. | 251/1.3 |
| 4,524,796 | A * | 6/1985 | Ayers et al. | 137/240 |
| 4,643,226 | A * | 2/1987 | Balz | 137/625.33 |
| 5,052,440 | A * | 10/1991 | Frank et al. | 137/625.33 |
| 5,094,270 | A * | 3/1992 | Reimert | 137/614.11 |
| 6,325,096 | B1 * | 12/2001 | Rising et al. | 137/454.2 |
| 2004/0026467 | A1 * | 2/2004 | Plattner et al. | 222/600 |
| 2005/0150559 | A1 * | 7/2005 | Kwon et al. | 137/630.12 |

OTHER PUBLICATIONS

Jason L. Pittman, et al. "A Minimum Thickness Gate Valve with Integrated Ion Optics for Mass Spectrometry", Boston University School of Medicine, 2004.

* cited by examiner

*Primary Examiner*—John K Fristoe, Jr.
*Assistant Examiner*—Marina Tietjen
(74) *Attorney, Agent, or Firm*—Bella Fishman; William R. McClellan

(57) ABSTRACT

A shutter and gate valve assembly includes a valve housing that defines a passage therethrough, a valve member having a valve aperture, the valve member movable between a non-operating position that seals the passage and an operating position that aligns the valve aperture with the passage, and a shutter movable between a closed position that blocks the valve aperture and an open position that unblocks the valve aperture. The shutter member may be affixed to and movable with the valve member between the non-operating position and the operating position. The shutter may be provided with a shutter aperture that is aligned with the valve aperture in the open position.

11 Claims, 7 Drawing Sheets

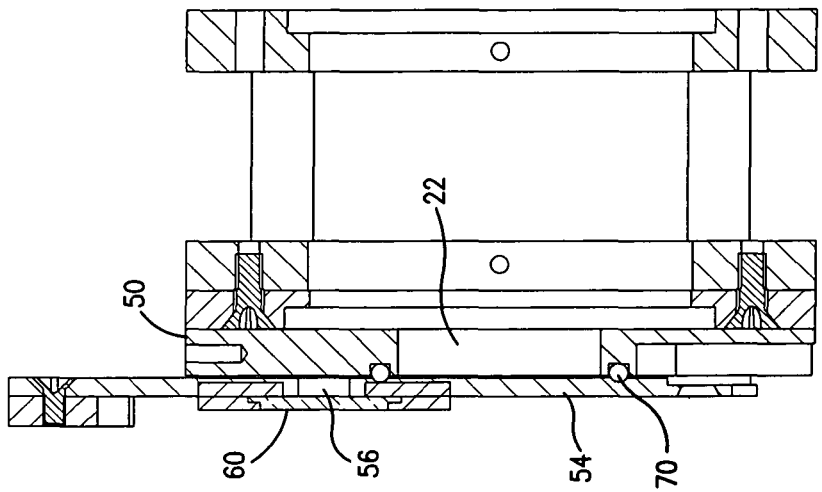
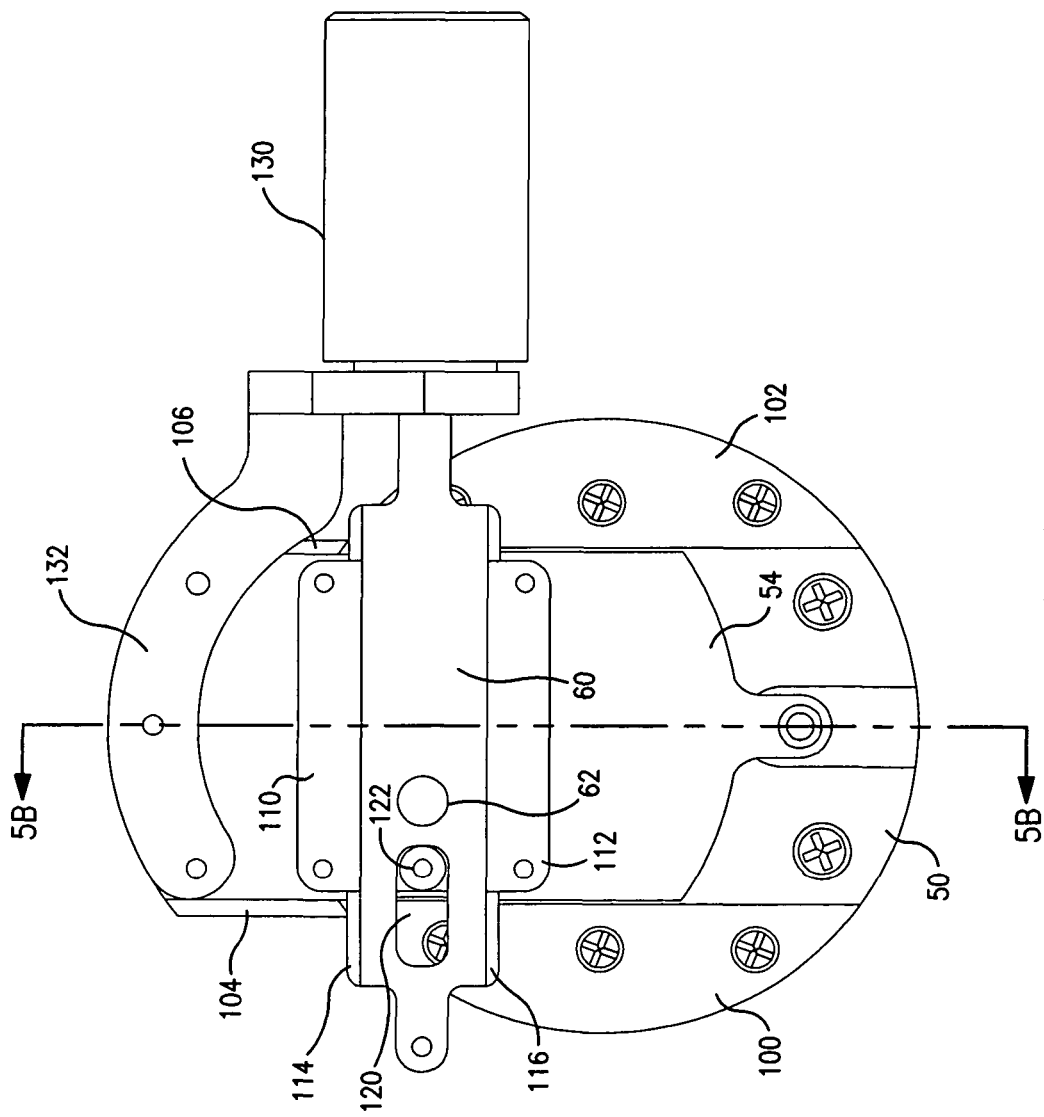

SHUTTER AND GATE VALVE ASSEMBLIES FOR VACUUM SYSTEMS

FIELD OF THE INVENTION

This invention relates to vacuum systems and, more particularly, to shutter and gate valve assemblies for use in vacuum systems.

BACKGROUND OF THE INVENTION

Many processing systems and instruments include one or more vacuum chambers. One example is a Fourier Transform Mass Spectrometer (FTMS) system which includes two vacuum chambers connected through an orifice. One vacuum chamber operates at relatively high vacuum, e.g. $10^{-10}$ Torr, and the other vacuum chamber operates at relatively low vacuum, e.g. $10^{-4}$ Torr. The orifice is provided with a shutter that separates the low vacuum region from the high vacuum region. The shutter is opened for brief periods, typically a fraction of a second, to allow transport of ions from the low vacuum chamber to the high vacuum chamber for analysis. The shutter may operate at frequent intervals, e.g. once every half second.

One requirement of systems which include a high vacuum chamber is to maintain the ultrahigh vacuum (ultralow pressure) continuously without venting or significant pressure increases. When the high vacuum chamber is vented or gas leaks into the high vacuum chamber and causes a rise in pressure, the time to vacuum pump to the desired ultrahigh vacuum may be lengthy, resulting in expensive downtime of the entire system. For example, vacuum pumping a chamber from atmosphere to a pressure of $10^{-10}$ Torr may require on the order of two days. Accordingly, it is desirable to maintain the ultrahigh vacuum during maintenance and other operations which require venting of the low vacuum chamber.

A shutter may be used to provide brief access to the high vacuum chamber. Typical shutters are designed to open and close quickly and to operate reliably over extended periods. However, shutters which meet these requirements are not equipped with high vacuum seals. Therefore, such shutters permit leakage of gas into the high vacuum chamber, particularly when the low vacuum chamber is vented to atmosphere.

Accordingly, there is a need for improved methods and apparatus for isolating a high vacuum chamber from a low vacuum chamber or from atmosphere during operation and maintenance.

SUMMARY OF THE INVENTION

According to a first aspect of the invention, vacuum apparatus comprises a high vacuum chamber, a low vacuum chamber and a shutter and gate valve assembly disposed between the high vacuum chamber and the low vacuum chamber. The shutter and gate valve assembly includes a valve housing that defines a passage between the high vacuum chamber and the low vacuum chamber, a valve member having a valve aperture, the valve member movable between a non-operating position that seals the passage and an operating position that aligns the valve aperture with the passage, and a shutter member movable between a closed position that blocks the valve aperture and an open position that unblocks the valve aperture.

According to a second aspect of the invention, a method is provided for interconnecting a high vacuum chamber and a low vacuum chamber. The method comprises mounting a shutter and gate valve assembly between the high vacuum chamber and the low vacuum chamber, the shutter and gate valve assembly including a valve housing that defines a passage between the high vacuum chamber and the low vacuum chamber, a valve member having a valve aperture, and a shutter member, moving the valve member between a non-operating position that seals the passage and an operating position that aligns the valve aperture with the passage, and moving the shutter member between a closed position that blocks the valve aperture and an open position that unblocks the valve aperture.

According to a third aspect of the invention, a shutter and gate valve assembly comprises a valve housing that defines a passage therethrough, a valve member having a valve aperture, the valve member movable between a non-operating position that seals the passage and an operating position that aligns the valve aperture with the passage, and a shutter member movable between a closed position that blocks the valve aperture and an open position that unblocks the valve aperture.

BRIEF DESCRIPTION OF THE DRAWINGS

For a better understanding of the present invention, reference is made to the accompanying drawings, which are incorporated herein by reference and in which:

FIG. 5A is a front view of the shutter and gate valve assembly, with the gate valve in the non-operating position; and FIG. 5B is a cross-sectional view of the shutter and gate valve assembly, taken along the line 5B-5B of FIG. 5A.

DETAILED DESCRIPTION

Figure 1:
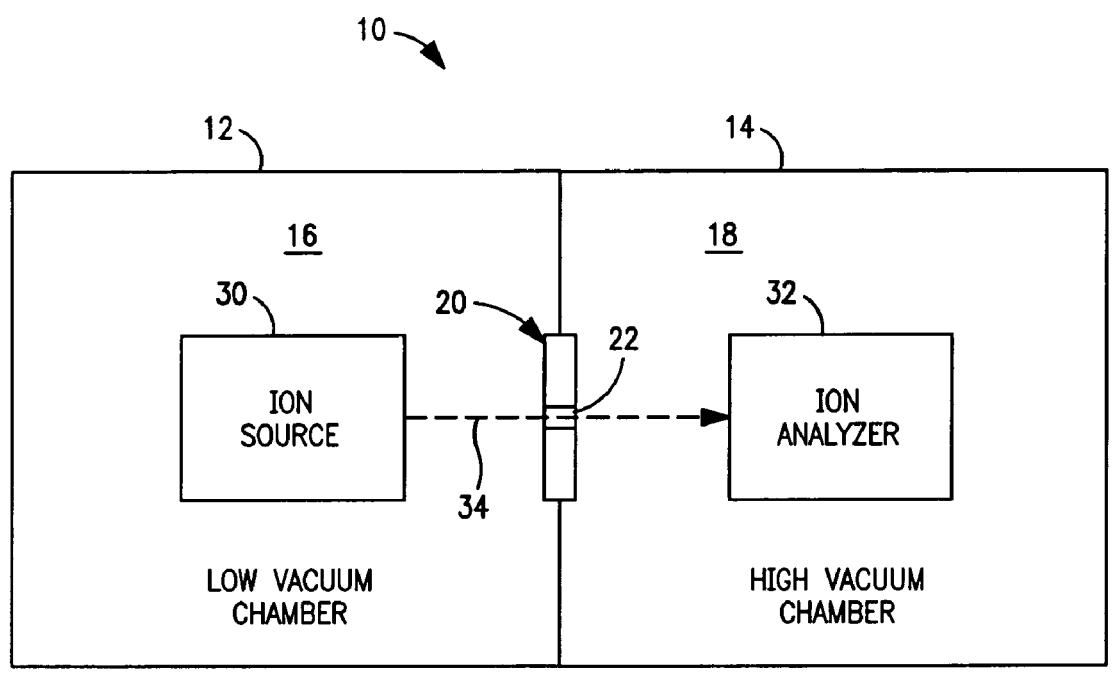
FIG. 1 is a schematic diagram of a vacuum system incorporating a shutter and gate valve assembly in accordance with an embodiment of the invention.

A highly simplified schematic diagram of vacuum apparatus in accordance with an embodiment of the invention is shown in FIG. 1. A vacuum system 10 includes a relatively low vacuum chamber 12 and a relatively high vacuum chamber 14. As used herein, the phrase "high vacuum" corresponds to relatively low pressure and the phrase "low vacuum" corresponds to relatively high pressure. Typically, the pressure in high vacuum chamber 14 is one or more orders of magnitude lower than the pressure in low vacuum chamber 12. Low vacuum chamber 12 defines a low vacuum region 16, and high vacuum chamber 14 defines a high vacuum region 18. By way of example only, high vacuum chamber 14 may be maintained at a pressure of about $10^{-10}$ Torr and low vacuum chamber 12 may be maintained during operation at a pressure of about $10^{-4}$ Torr. When low vacuum chamber 12 is vented, low vacuum chamber 12 is exposed to atmospheric pressure. It will be understood that these pressure levels are given by way of example only and are not limiting as to the scope of the present invention.

Vacuum system 10 further includes a shutter and gate valve assembly 20 between low vacuum chamber 12 and high vacuum chamber 14. As described in detail below, shutter and gate valve assembly 20 defines a passage 22 between low vacuum chamber 12 and high vacuum chamber 14. Passage 22 may be opened and closed in an operating state of vacuum system 10 and may be sealed in a non-operating state of vacuum system 10. The shutter and gate valve assembly 20 thus provides a controllable interconnection between low vacuum chamber 12 and high vacuum chamber 14.

By way of example only, vacuum system 10 may be a Fourier Transform Mass Spectrometer System which includes an ion source 30 in low vacuum chamber 12 and an ion analyzer 32 in high vacuum chamber 14. Ions generated by ion source 30 may be transported along a path 34 through passage 22 to ion analyzer 32 for analysis. The details of FTMS systems are known to those skilled in the art.

Figure 2A:
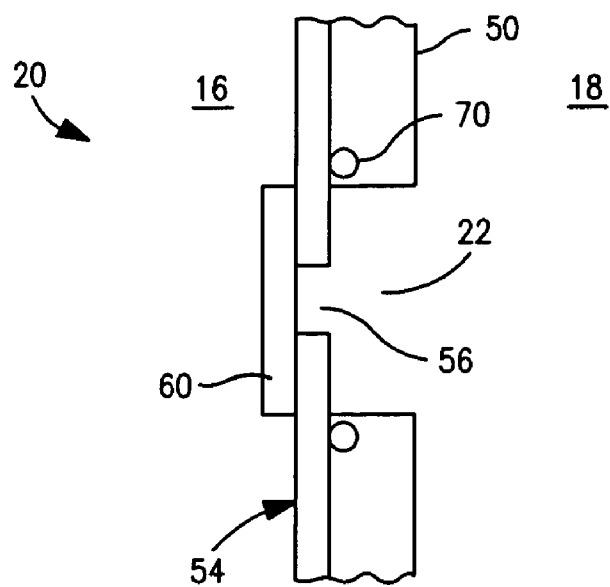
FIG. 2A is a schematic diagram of a shutter and gate valve assembly, with the gate valve in the operating position and the shutter in the closed position.
Figure 2B:
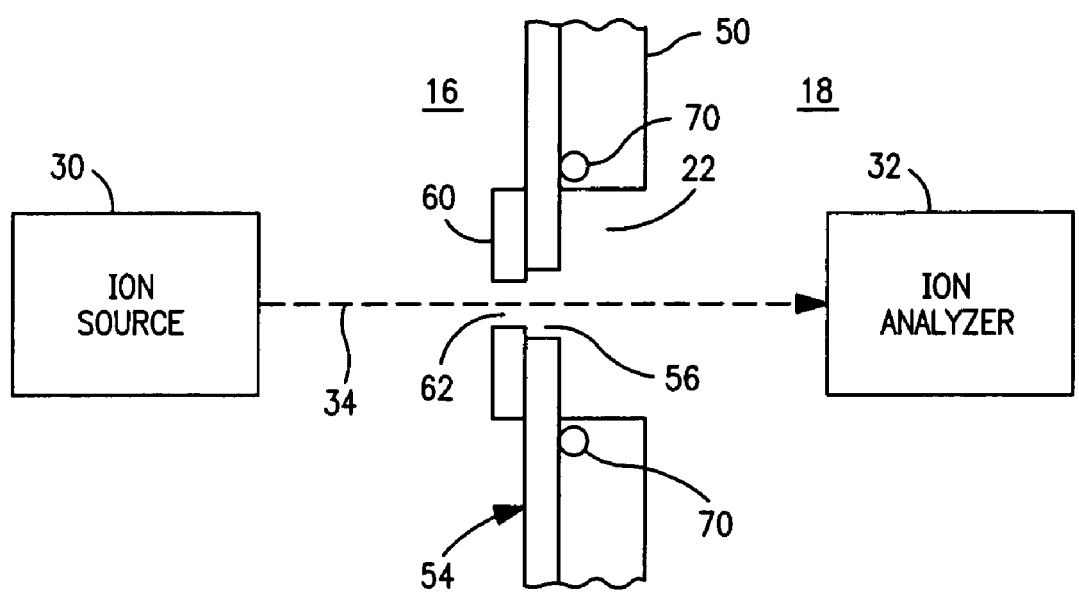
FIG. 2B is a schematic diagram of the shutter and gate valve assembly, with the gate valve in the operating position and the shutter in the open position.
Figure 2C:
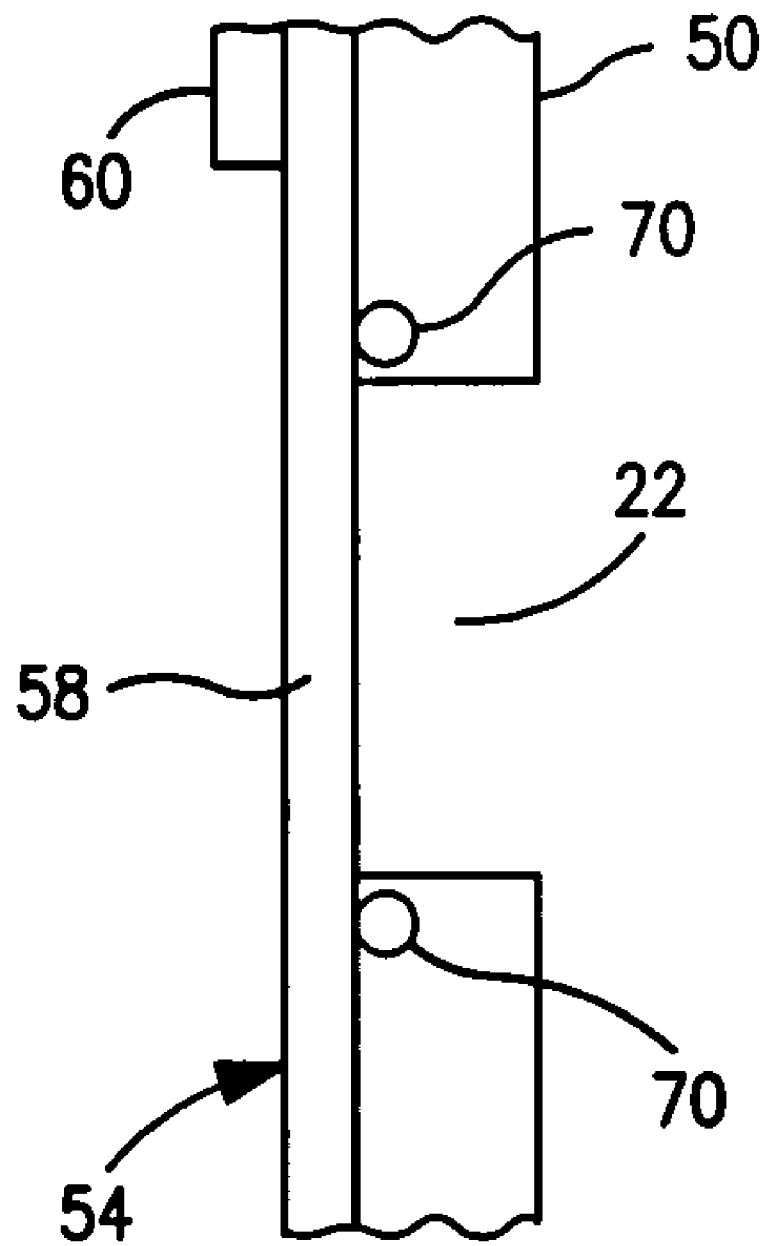
FIG. 2C is a schematic diagram of the shutter and gate valve assembly, with the gate valve in the non-operating position.

Simplified cross-sectional diagrams of shutter and gate valve assembly 20 are shown in FIGS. 2A-2C. Shutter and gate valve assembly 20 may include a valve housing 50 that defines passage 22 between low vacuum chamber 12 and high vacuum chamber 14. Valve housing 50 may be sealed vacuum tight to vacuum chamber 12, to vacuum chamber 14, or to both. Shutter and gate valve assembly 20 further includes a valve member 54, a shutter member 60 and an elastomer ring 70. Valve member 54 includes a valve aperture 56 and a solid, non-apertured seal area 58 (FIG. 2C). Shutter member 60 includes a shutter aperture 62. Elastomer ring 70 is mounted in a groove in valve housing 50 that surrounds passage 22.

Valve member 54 is movable between an operating position, shown in FIGS. 2A and 2B, and a non-operating position, shown in FIG. 2C. In the operating position, valve aperture 56 is aligned with passage 22. In the non-operating position of FIG. 2C, valve aperture 56 is moved out of alignment with passage 22 and seal area 58 of valve member 54 is positioned over passage 22. The seal area 58 of valve member 54 compresses elastomer ring 70 and produces a vacuum tight seal of passage 22.

Shutter member 60 is movable between a closed position that blocks valve aperture 56, as shown in FIG. 2A, and an open position in which shutter aperture 62 is aligned with valve aperture 56 and passage 22, as shown in FIG. 2B. In the open position of shutter member 60, low vacuum region 16 is connected to high vacuum region 18 through shutter aperture 62, valve aperture 56 and passage 22. Thus, as shown in FIG. 2B, ions can pass from ion source 30 in low vacuum region 16 along path 34 to ion analyzer 32 in high vacuum region 18.

In general, shutter member 60 is designed to operate at high speed between the closed position shown in FIG. 2A and the open position shown in FIG. 2B. By way of example only, shutter member 60 may be in the open position of FIG. 2B for a fraction of a second. Shutter member 60 may be in the open position of FIG. 2B for as brief a time as possible, consistent with the operation of the system. In order to achieve high speed operation, shutter member 60 is not sealed to valve member 54. Thus, gas may leak between shutter member 60 and valve member 54 from the low vacuum chamber 12 to the high vacuum chamber 14 when the shutter member 60 is in the closed position. Such leakage may be acceptable during operation of the vacuum system, but may not be acceptable when low vacuum chamber 12 is vented to atmosphere for maintenance and other operations which require access to low vacuum chamber 12. Accordingly, when the low vacuum chamber 12 is vented to atmosphere or is otherwise in a non-operating condition, valve member 54 is moved to the non-operating position shown in FIG. 2C. In the non-operating position, seal area 58 of valve member 54 covers passage 22 and, with elastomer ring 70, provides a vacuum-tight seal of passage 22. Thus, low vacuum chamber 12 can be vented to atmosphere without significant leakage into high vacuum chamber 14.

An implementation of shutter and gate valve assembly 20 is shown in FIGS. 3, 4A, 4B, 4C, 5A and 5B. Like elements in FIGS. 1-5B have the same reference numerals. It will be understood that the implementation of FIGS. 3-5B is given by way of example only and is not limiting as to the scope of the present invention.

Figure 3:
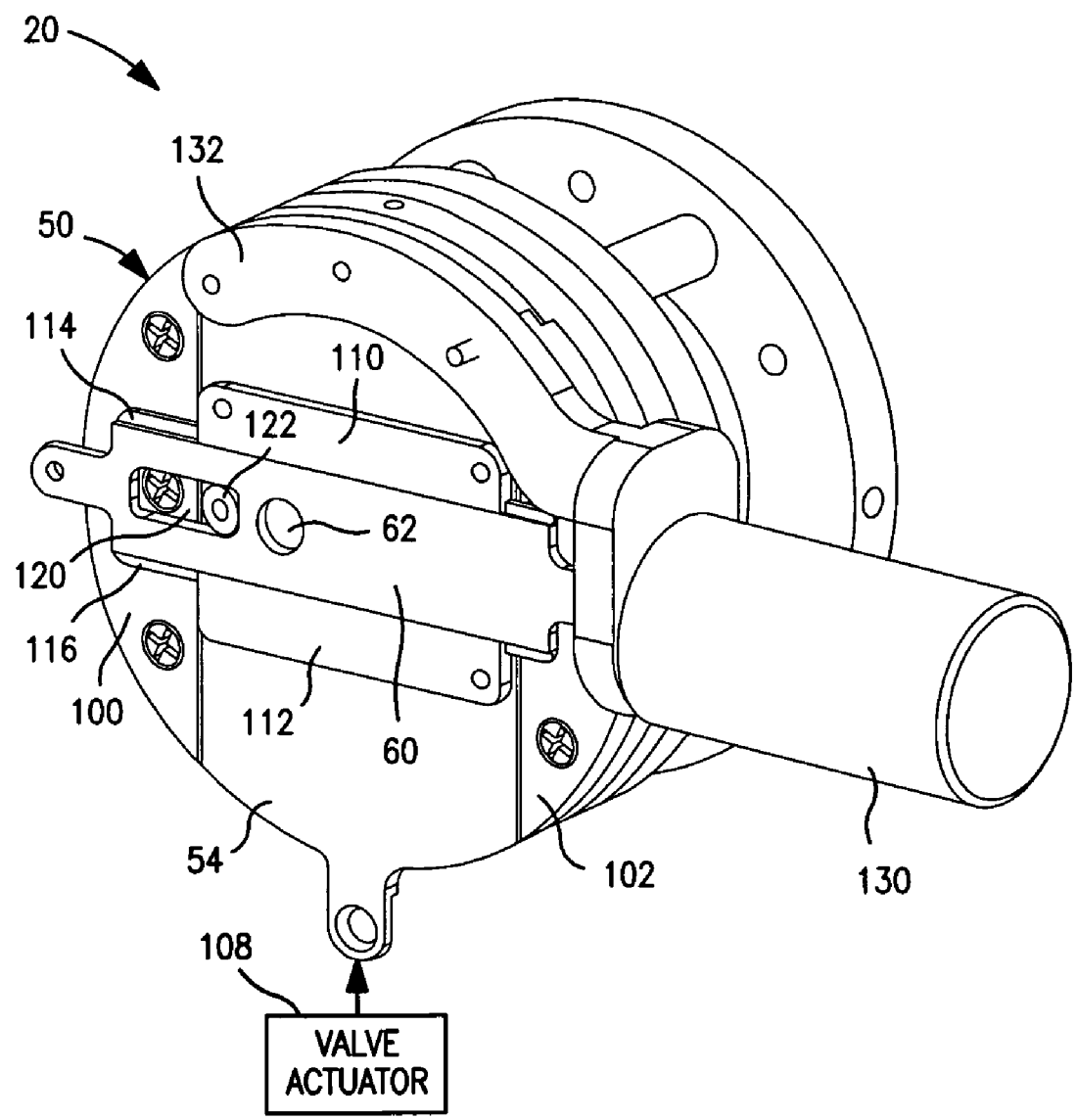
FIG. 3 is a perspective view of a shutter and gate valve assembly in accordance with an embodiment of the invention.
Figure 4B:
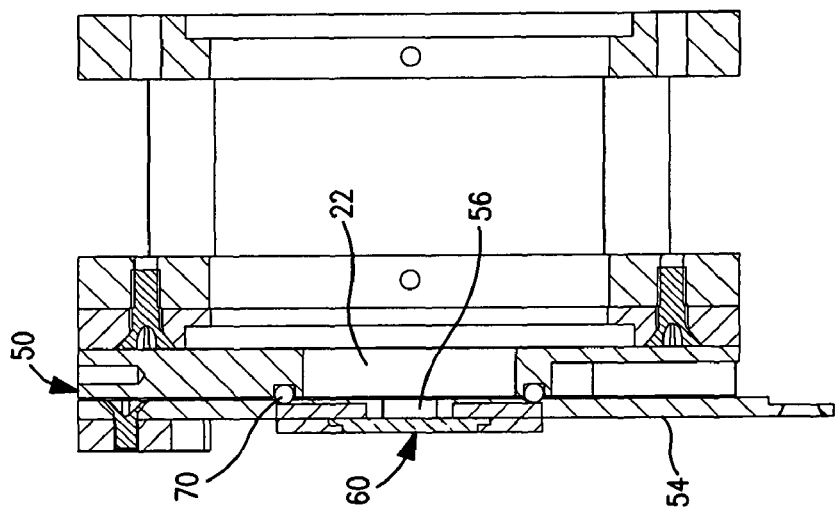
FIG. 4B is a cross-sectional view of the shutter and gate valve assembly, taken along the line 4B-4B of FIG. 4A.
Figure 4A:
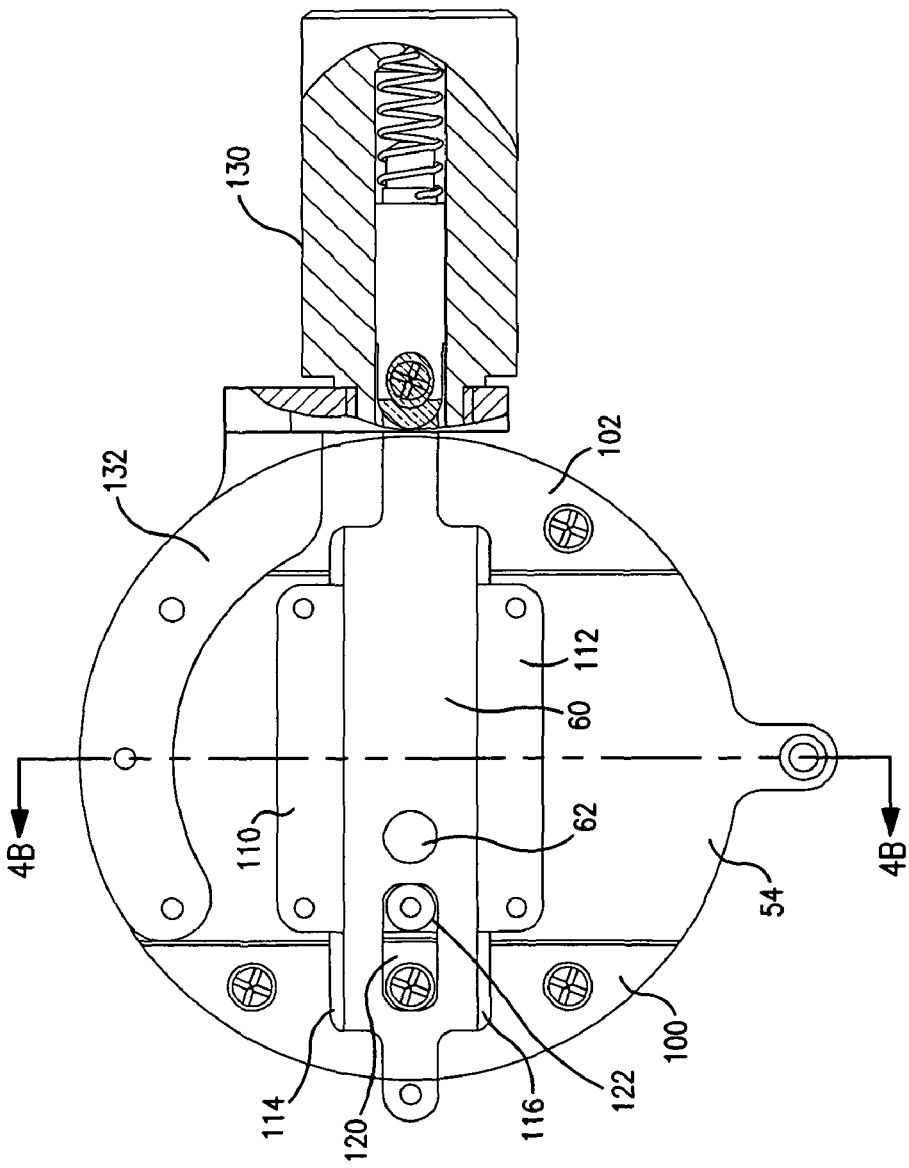
FIG. 4A is a front view of the shutter and gate valve assembly, with the gate valve in the operating position and the shutter in the closed position.
Figure 4C:
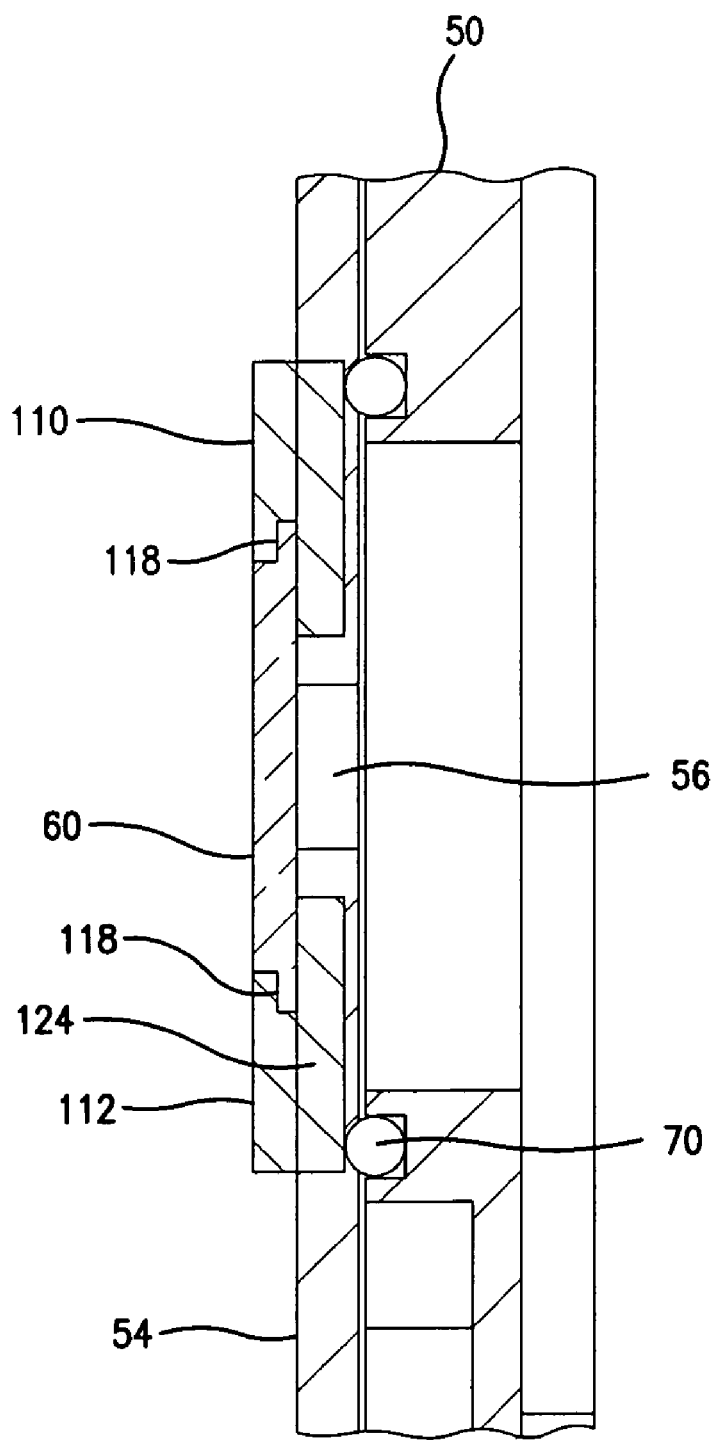
FIG. 4C is an enlarged, partial cross-sectional view of the shutter and gate valve assembly.

Valve member 54 is configured for vertical movement between the operating position, shown in FIGS. 4A and 4B, and the non-operating position, shown in FIGS. 3, 5A and 5B. Valve member 54 is retained in position and is guided between the operating and non-operating positions by valve guides 100 and 102. Valve guides 100 and 102 may be mounted to valve housing 50 or may be an integral part of valve housing 50. Each of valve guides 100 and 102 is provided with a groove (not shown) which engages ribs 104 and 106 (FIG. 5A) along opposite side edges of valve member 54. Ribs 104 and 106 slide in the respective grooves of valve guides 100 and 102 as valve member 54 is moved to and between the operating position and the non-operating position. Valve member 54 may have the form of a generally flat plate provided with ribs 104 and 106, valve aperture 56 and seal area 58.

A valve actuator 108 (FIG. 3) is connected to valve member 54 and causes valve member 54 to move between the operating and non-operating positions in response to a control signal. By way of example, valve actuator 108 may be a pneumatic cylinder. Valve actuator 108 is mounted to a fixed part of vacuum system 10.

In the embodiment of FIGS. 3-5B, shutter member 60 is horizontally slidable between the closed position, shown in FIGS. 4A and 5A, and the open position in which shutter aperture 62 is aligned with valve aperture 56 (FIG. 2B). Shutter member 60 is retained on valve member 54 and is guided between the open and closed positions by shutter guides 110 and 112. Shutter guides 110 and 112 may be mounted to valve member 54 or may be an integral part of valve member 54. Shutter member 60 is provided with ribs 114 and 116 along opposite side edges which engage grooves 118 (FIG. 4C) in the respective shutter guides 110 and 112. Shutter member 60 is further provided with an elongated aperture 120 that engages a stop 122 affixed to valve member 54. The length and position of shutter aperture 120 and the position of stop 122 determine the travel of shutter member 60 between the open and closed positions. As shown in FIG. 4C, a shutter insulator 124 is mounted in a recess in valve member 54, and shutter guides 110 and 112 are mounted to shutter insulator 124. This structure permits a bias voltage to be applied to shutter member 60.

A shutter actuator 130 is mounted to valve member 54 by an actuator support 132. A movable element 134 of shutter actuator 130 is attached to shutter member 60 and causes shutter member 60 to move between the open and closed positions in response to a control signal applied to shutter actuator 130. By way of example, shutter actuator 130 may be a solenoid. As shown, shutter member 60 and shutter actuator 130 are affixed to valve member 54 and move with the valve actuator 54 between the operating and non-operating positions.

The operating position of valve member 54 is shown in FIGS. 4A and 4B. In the operating position, valve aperture 56 is aligned with passage 22 in valve housing 50. Shutter member 60 is normally closed and blocks valve aperture 56. As a result, the high vacuum chamber is isolated from the low vacuum chamber, except for any leakage associated with the shutter. The shutter may be opened by energizing shutter actuator 130, causing shutter member 60 to move to the right in FIG. 4A, so that shutter aperture 62 is aligned with valve aperture 56. In the embodiment of FIGS. 3-5B, shutter member 60 is configured for sliding, in-line movement between the open and closed positions.

As indicated above, the shutter may leak because shutter member 60 is not sealed to valve member 54. When sealing of passage 22 is required, valve member 54 is moved to the non-operating position as shown in FIGS. 5A and 5B. Valve member 54 is moved vertically from the operating position to the non-operating position by operation of valve actuator 108. In the non-operating position, valve aperture 56 is no longer in alignment with passage 22. Instead, the seal area 58 of valve member 54 covers passage 22. Valve member 54 partially compresses elastomer ring 70, thereby sealing passage 22 and preventing leakage of gas from the low vacuum chamber into the high vacuum chamber. With the valve member 54 in the non-operating position, the low vacuum chamber can be vented to atmosphere for maintenance and other operations which require access to the low vacuum chamber, without degrading the vacuum in the high vacuum chamber.

The shutter and gate valve assembly has been described as interconnecting a low vacuum chamber and a high vacuum chamber, but is not limited to this application. The shutter and gate valve assembly can be used to provide access to any vacuum chamber from another vacuum chamber or from atmospheric pressure. Also, the shutter and gate valve assembly can have various configurations. For example, the shutter is not limited to sliding movement between the open position and the closed position.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. Vacuum apparatus comprising:
   a high vacuum chamber;
   a low vacuum chamber; and
   a shutter and gate valve assembly disposed between the high vacuum chamber and the low vacuum chamber, the shutter and gate valve assembly including:
   a valve housing that defines a passage between the high vacuum chamber and the low vacuum chamber,
   a valve member having a valve aperture, the valve member movable between a non-operating position that seals the passage and an operating position that aligns the valve aperture with the passage, and
   a shutter member having a shutter aperture, the shutter member attached to the valve member and movable therewith between a closed position that blocks the valve aperture and an open position that unblocks the valve aperture;
   a gate valve actuator mechanically coupled to the valve member, moving the valve member between a non-operating position to an operating position upon activation; and
   a shutter valve actuator mechanically coupled to the shutter member, moving the shutter member between a closed position and an open position upon activation.

2. Vacuum apparatus as defined in claim 1, wherein the shutter aperture is aligned with the valve aperture in the open position.

3. Vacuum apparatus as defined in claim 2, wherein the shutter member is slidable relative to the valve member between the closed position and the open position.

4. Vacuum apparatus as defined in claim 1, wherein the shutter and gate valve assembly further includes a valve actuator operably coupled to the valve member to move the valve member between the non-operating position and the operating position.

5. Vacuum apparatus as defined in claim 1, wherein the valve member is movable in a first direction relative to the valve housing and the shutter member is movable in a second direction relative to the valve member.

6. Vacuum apparatus as defined in claim 1, wherein the shutter and gate valve assembly further includes shutter guides affixed to the valve member, wherein the shutter member is slidable in the shutter guides between the closed position and the open position.

7. Vacuum apparatus as defined in claim 1, wherein the shutter and gate valve assembly further includes an elastomer ring mounted in the valve housing to provide a seal between the valve member and the valve housing when the valve member is in the non-operating position.

8. Vacuum apparatus as defined in claim 1, wherein the shutter and gate valve assembly further includes valve guides affixed to the valve housing, wherein the valve member is slidable in the valve guides between the operating position and the non-operating position.

9. A method of interconnecting a high vacuum chamber and a low vacuum chamber, comprising:
   mounting a shutter and gate valve assembly between the high vacuum chamber and the low vacuum chamber, the shutter and gate valve assembly including a valve housing that defines a passage, a valve member having a valve aperture, a gate valve actuator coupled to the gate valve assembly, a shutter member attached to said valve member and movable therewith, a shutter valve actuator mechanically coupled to shutter member and;
   moving the valve member between a non-operating position that seals the passage and an operating position that aligns the valve aperture with the passage in response to a control signal form the gate valve actuator; and
   moving the shutter member between a closed position that blocks the valve aperture and an open position that unblocks the valve aperture in response to a control signal from the shutter valve actuator.

10. The method as defined in claim 9, wherein moving the valve member comprises sliding the valve member relative to the valve housing in valve guides between the non-operating position and the operating position.

11. The method as defined in claim 10, wherein moving the shutter member comprises sliding the shutter member relative to the valve member in shutter guides between the closed position and the open position.

* * * * *